Dec. 16, 1958 W. KOBER 2,864,964
MULTIPLE GENERATOR UNIT
Filed Oct. 3, 1955 2 Sheets-Sheet 2

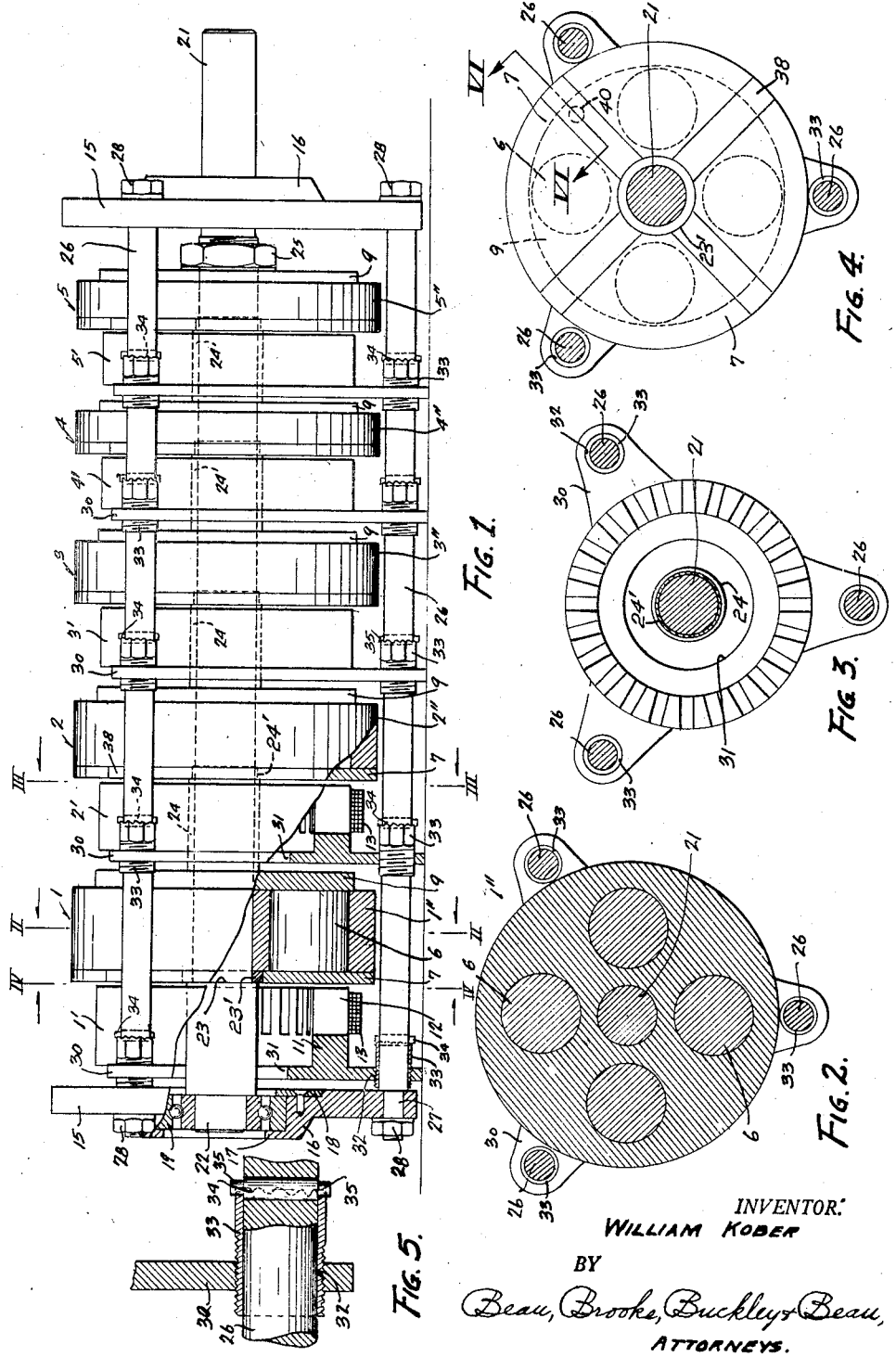

INVENTOR:
WILLIAM KOBER
BY
Beau, Brooks, Buckley & Beau,
ATTORNEYS.

United States Patent Office

2,864,964
Patented Dec. 16, 1958

2,864,964

MULTIPLE GENERATOR UNIT

William Kober, Fairport, N. Y., assignor to TKM Electric Corporation, Rochester, N. Y.

Application October 3, 1955, Serial No. 538,138

15 Claims. (Cl. 310—112)

This invention relates generally to the electric generator art, and more specifically to a new and useful multiple frequency generator set.

This invention is primarily concerned with the problem of generating alternating current at different frequencies arising, for example, in bell ringing generators for party line telephones. Various frequency series are used for this purpose, the most common being the decimonic comprising frequencies of 20, 30, 40, 50 and 60 C. P. S. and the harmonic series comprising frequencies of 16⅔, 25, 33⅓, 50 and 66⅔ C. P. S.

The generator sets now used for this purpose commonly comprise multiple radial air gap, electromagnetic generators, several of which are driven at different speeds by one motor through belt drives. This method of multiple frequency generation possesses several significant disadvantages in that, for example, it requires a considerable amount of space and cannot conveniently be used in many installations. Also, the belt drive represents a power loss factor, different types of generators are used which add to the expense, and the system has an unbalanced capacity.

Accordingly, it is a primary object of my invention to provide a multiple frequency generator set which is characterized by extreme simplicity and compactness, and which is readily assembled and installed, and moved from one installation to another.

Still another object of my invention is to provide a multiple frequency generator set wherein the various generator units are of the same type, and have the same regulation and capacity.

It is also an object of my invention to provide a multiple frequency generator set having means for selective individual voltage adjustment of each generator unit thereof.

In one aspect thereof, a generator assembly according to my invention is characterized by the provision of plural axial air gap generator units arranged in end-to-end relation.

In another aspect thereof, a generator assembly according to my invention is characterized by the provision of an axial air gap generator having an armature and a permanent magnet rotating field, and means mounting the armature for selective positional adjustment toward and away from the rotating field, to vary the length of the air gap therebetween, such position adjustment means using the force of magnetic attraction between the armature and the field to hold the armature in adjusted position.

In still another aspect thereof, a generator set constructed in accord with my invention is characterized by the provision of a pole piece structure comprising a disc like member having non-magnetic inserts dividing the same into pole piece sectors, and/or by the method of making an axial air gap pole piece structure which comprises taking a disc or rod of pole piece material, forming slots therein dividing the same into pole piece sectors, and securing non-magnetic inserts in said slots.

The foregoing and other objects, advantages and characterizing features of a multiple frequency generator set in accord with my invention will become readily apparent from the ensuing detailed description of a presently preferred embodiment of my invention, taken together with the accompanying drawing forming a part thereof wherein:

Fig. 1 is a view in side elevation of a multiple frequency generator set according to my invention, certain parts being cut away for greater clarity;

Fig. 2 is a transverse sectional view taken about on line II—II of Fig. 1;

Fig. 3 is a transverse sectional view taken about on line III—III of Fig. 1;

Fig. 4 is a transverse sectional view taken about on line IV—IV of Fig. 1;

Fig. 5 is a fragmentary detail view, partly in section, showing the adjustable positioning means for the stator.

Figure 6:
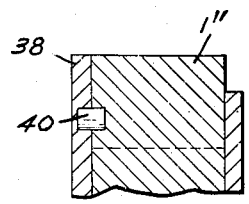
Fig. 6 is a longitudinal sectional view of a rotor showing aligning means positioning the pole piece structure with respect to the rotor body.

A multiple frequency generator set in accord with a presently preferred embodiment of my invention includes a number of permanent magnet, rotating field, axial air gap generator units axially aligned in end-to-end relation, five such units being illustrated and generally designated 1, 2, 3, 4, and 5. Each generator unit comprises a stator, designated 1′, 2′, 3′, 4′ and 5′, respectively, and a rotor designated 1″, 2″, 3″, 4″ and 5″, respectively, and the various units are identical in construction excepting for certain dimensions and the number of poles therein.

Each rotor 1″ through 5″ is constructed in accord with my earlier invention as set forth in detail in my pending application Ser. No. 216,185, now Patent No. 2,719,931, and comprises a rotor body formed of a material characterized by a high degree of mechanical strength and a high degree of electrical conductivity, such as for example wrought Duralumin. The rotor body can be a laminated structure. Permanent magnets 6 are carried by said rotor body in substantial parallelism with the axis of rotor rotation, the magnets being for example fitted into apertures extending through the rotor body, whereby the rotor body functions both as a strong mechanical support completely surrounding the magnets for substantially the entire length thereof and holding them in compression, and as a protective member encircling the magnets for substantially the entire length thereof with a highly electrically conductive path preserving the magnets from overload and short circuit armature reaction. Pole pieces 7 are secured against the air gap end faces of the magnets 6, in a manner to be described, and a plate 9 is secured against the other ends of the magnets to provide a flux return path.

The stators 1′ through 5′ each comprise an annular member 11 having a series of teeth 12 facing the air gap end face of the rotor associated therewith and a conventional pancake type winding 13 therein, the material behind the teeth providing a flux return path.

The generator units 1 through 5 are provided with a different number of magnets and pole pieces, to give the different frequencies desired, but are all of the same type, and it is of particular significance that the units can each have substantially the same capacity and that the rotors 1″ through 5″ thereof can all be of the same diameter, thereby providing a balanced system of diametral unity which is extremely desirable for reasons which will become apparent, with dimensional variation appearing in the size of the magnets and in the length of the different units. This latter variation is not objectionable, and is readily accommodated in a generator set of my invention where the units are axially aligned in end-to-end relation.

In accord with my invention, the various generator units are mounted on a common frame, with the stators being mounted independently of the rotors in a manner providing for individual positional adjustment thereof. Thus, in the preferred embodiment shown in the drawing, the entire series of generators is mounted on a frame comprising two end plates 15 each of which is formed with an annular boss 16 terminating at its outer side in a shoulder 17, which, together with a ring 18 secured as by rivets in an annular recess on the inner face of the boss 16, serves to retain a bearing generally designated 19.

The respective generator units are mounted on a common drive shaft 21 adapted to be driven from a suitable motor, not illustrated. At one end thereof, shaft 21 has a portion 22 of reduced diameter journalled in a bearing 19, and shaft 21 is formed adjacent that end with a shoulder 23 therearound. The rotors 1" through 5" are centrally apertured to receive shaft 21 therethrough, and are slipfitted on said shaft in the order shown with rotor 1" bearing against shoulder 23 and with the remaining rotors 2" through 5" being spaced apart from rotor 1" and from each other by spacing sleeves 24 encircling shaft 21 and abutting the adjacent end faces of adjacent rotors. The series of rotors are then clamped in position as by means of a nut 25 threaded on shaft 21 and bearing against the flux return plate 9 of rotor 5", whereby the series of rotors are clamped between shoulder 23 and nut 25 for rotation with shaft 21. Of course, if desired, conventional key or spline means could be interposed between rotors 1" through 5" and shaft 21 to prevent relative rotation thereof.

The stator mounting means will now be described. Three mounting rods or bars 26, spaced apart to form an equilateral triangle, extend between the end plates 15, each rod 26 being formed with reduced end portions 27 extending through openings in the end plates 15 and the rods and end plates being secured together as by the nuts 28 threadedly engaging the opposite ends of the rods.

Each stator is secured, as by welding, to a spider 30 having a central opening 31 of a size to pass therethrough the shaft 21, the shoulder 23 and the spacing sleeves 24. Each spider 30 is provided with three branches aligned with the rods 26, and each branch has an internally threaded opening 32. Externally threaded mounting sleeves 33, adapted to slip-fit over the rods 26, threadedly engage the internally threaded openings 32 of the spiders 30. Thus, each stator 1' through 5' is mounted on the three rods 26 by means of the spider 30 associated with that stator, and the spiders 30 slide along rods 26 until the positioning sleeves 33 abut pins 34 extending diametrically through the rods 26.

Pins 34 comprise an enlarged body portion fitted in holes extending diametrically through rods 26, and having at their opposite ends portions 35 of reduced diameter, which fit in serrations 36 around one end of sleeves 33, and define shoulders 37 which bear against the inner walls of sleeves 33 to hold pins 34 against falling out of rods 26, all as and for a purpose more fully described hereinafter.

When assembling a generator set according to my invention, each unit is initially assembled with the rotor and stator thereof held together magnetically. Stator 1' and its associated rotor 1" are then slipped over shaft 21 to a position where rotor 1" abuts shoulder 23.

The first spacing sleeve 24 is then slipped over shaft 21 until it abuts the return end of rotor 1", following which stator 2' and rotor 2" are slipped over shaft 21 until the air gap end of rotor 2" abuts the spacing sleeve 24. This procedure is repeated until all of the stator-rotor uints are assembled on shaft 21 and positioned thereon by nut 25. Positioning sleeves 33 then are fitted to the spiders 30, if that has not already been done, and rods 26 are slipped therethrough. End plates 15 then are positioned with shaft 21 journalled therein and with nuts 28 securing rods 26 thereto. At this point, pins 34 are inserted with sleeves 33 abutting thereagainst.

It will be noted that the stator and rotor of each unit have their working faces in parallelism, because they abut, initially. It is a particular feature of this invention that means are provided for individually positionally adjusting the stator, relative to the rotor, to adjust the air gap therebetween, and that the magnetic attraction therebetween is used to retain the stators in adjusted position. Thus, pins 34 are intended to abut sleeves 33 and thereby limit movement of the stator toward the rotor because of such magnetic attraction. The sleeves 33 are selectively operable to individually positionally adjust the stator associated therewith, relative to the associated rotor, and this is accomplished as follows. Sleeves 33 are held tightly against pins 34 by the magnetic attraction between the stator and the rotor. Therefore, as the sleeves 33 of each yoke are rotated about rods 26 as an axis they will either advance the yoke and stator associated therewith toward the rotor or retract them from the rotor, depending on the direction in which they are rotated, thereby varying the position of the stator with respect to its associated rotor. By individually rotating the mounting sleeves 33 of a particular stator, the stator can be accurately aligned with the rotor, so that their working faces are in true parallelism, and by simultaneously adjusting all of the positioning sleeves of a particular stator, the length of the air gap can be varied to selectively adjust the output voltage of each generator unit.

The ends of the sleeves 33 are serrated, as indicated at 36, to interlock with the ends 35 of pins 34, and extend over the shoulders 37 of the pins to lock them against falling from rods 26. Also sleeves 33 preferably have a portion of flat sided form to receive a wrench or similar tool for conveniently rotating the same for position adjusting movement thereof.

Also, it is a particular feature of a multiple generator set in accord with my invention that adjacent generator units are effectively shielded against magnetic interference, without the use of additional shielding, because the end plate 9 of one unit, such as for example at the back of rotor 1" together with the adjacent stator 2' of the adjacent unit, effectively magnetically shields such adjacent units.

While any of several different methods of securing the pole pieces in position could be used in accord with this invention I prefer to use a certain novel method of forming the pole piece structure, as follows. In accord with my invention, I take a plate or rod of suitable magnetic material, such as magnetic steel, and mill the same to define a number of grooves extending lengthwise thereof equal to the number of pole pieces to be formed. These grooves or slots extend nearly to the center, but not completely, so that the plate or bar remains an integral unit, and then spacing inserts 38 of suitable non-magnetic material, such as brass or stainless steel, are fitted in the slots and bonded thereto as by brazing, using for example silver solder.

Thus, the inserts 38 define therebetween sectors which comprise the pole pieces 7 and when the brazing or bonding operation is completed the hole for shaft 21 is bored therethrough, centrally thereof, and it will be noted that inserts 38 extend inwardly toward the center a distance sufficient so that they extend to the hole provided for the shaft 21.

While if the shaft 21 were of non-magnetic material, the pole piece structure, which now comprises the separated segments 7 held in place by the inserts 38 bonded thereto, could bear against the shaft, in the instant case I prefer to provide spacing sleeves 24 of non-magnetic material having at one end collar portions 24' of reduced diameter, which collar portions receive and mount the pole piece structures thereby magnetically separating them and properly positioning them concentrically of shaft 21. In this case, for the rotor 1″, a separate non-magnetic collar element 23′ would be provided adjacent the shaft shoulder 23.

With this arrangement, spacing sleeves 24 hold the rotors in spaced relation and also hold together the pole piece structure, rotor body and return plate 9 of each rotor.

While the plate on which the pole piece structure is made could conceivably be of just the right thickness, I contemplate making the same in an elongated bar form, and then cutting pole piece sections of the proper width from the bar. It will be appreciated that this method facilitates the manufacture of pole piece structures which present flat surfaces to the ends of the magnets.

Also, I provide means for aligning the pole piece sectors 7 with the magnets 6, during assembly, and for holding them in alignment, which means can comprise one or more pins 40 fitted in opposed recesses or holes formed on the abutting faces of the pole piece structure and the rotor body. Also, where more than one pin 40 is used, such as two pins on opposite sides of shaft 21, they will also position the pole piece structure concentrically with the rotor body and the shaft 21, and collars 23′ and 24′ can be dispensed with.

Figure 7:
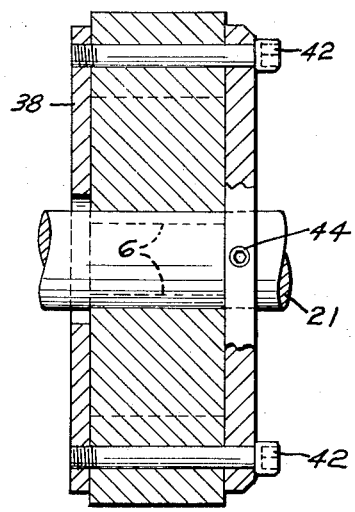
Fig. 7 is a side elevational view of a rotor showing another assembling and positioning means.

Fig. 7 shows an alternative method of assembling rotors 1″ through 5″ on shaft 21, and positioning them with respect thereto, which dispenses with spacing sleeves 24 and nut 25. In this arrangement, the pole piece structures are secured to their associated rotor bodies by tie rod means such as rivets or screws 42 passing from end plate 9′, which is keyed and locked to shaft 21 by suitable means, such as screws 44, through the rotor body between the magnets 6 and into the pole piece structure, which rivets or screws clamp the pole piece structure and the end plate 9′ against the respective surfaces of the magnets, and position them concentrically and prevent slipping and rotation. Another advantage of this arrangement is that the rotor body can "float" between the pole piece structure and the end plate, without interfering with the firm contact between the pole pieces, end plate and magnets which is useful in preserving magnetic continuity.

Accordingly, it is seen that my invention fully accomplishes the aforesaid objects. The generator assembly of my invention is adapted to meet the requirements of both the decimonic and the harmonic systems, using a total of only six generators, in that for example five generators having four, six, eight, ten and twelve poles, respectively, driven at 600 R. P. M. will generate frequencies required for the decimonic system, and five generators having four, six, eight, twelve and sixteen poles, respectively, rotated at 500 R. P. M. will satisfy the harmonic system. Therefore, if desired, a single unit having a total of only six different generators, having four, six, eight, ten, twelve and sixteen poles, respectively, together with driving motor means which are adapted to drive the assembly at the different required speeds, can meet the requirements of both systems. The unit is extremely compact, and is readily adjusted and easily handled, occupying a relatively small amount of room.

Of course, while the instant invention is disclosed in a particular embodiment designed for a multiple frequency generating unit, it will be appreciated that I do not necessarily intend to be limited to the details of such embodiment, or even necessarily to a system for generating multiple frequencies, and instead I intend that my invention be defined by the appended claims. Also, various features of this invention can be used apart from a multiple generator assembly.

Having fully disclosed and completely described my invention, together with its mode of operation, what I claim as new is:

1. A multiple frequency generator set comprising, multiple axial air gap generator units each including a stator and a rotor with certain of said units having a number of poles different from others of said units, and means mounting said units in end-to-end relation including means mounting said stators for individual position adjusting movement thereof relative to the rotors associated therewith, said last-named means including self-locking means using the force of magnetic attraction between said stators and their associated rotors to hold the former in adjusted position relative to the latter.

2. A multiple frequency generator set comprising, multiple axial air gap generator units each including a stator and a rotor having cooperating working surfaces separated in the direction of the axis of rotor rotation with certain of said units having a number of poles different from the other of said units, and means mounting said units in end-to-end relation including shaft means mounting said rotors for rotation about a common axis, mounting means common to said stators, and means mounting said stators on said common mounting means including adjustable positioning means for each of said stators mounting the same for movement along said common axis independently of the other stators and of said rotors, said positioning means being selectively adjustable to bring the working surface of each stator into parallelism with the working surface of the rotor associated therewith and to move each stator toward and away from its associated rotor while maintaining the parallelism between the working surfaces thereof thereby to selectively vary the output voltage of each unit independently of the other units.

3. A generator set comprising multiple generator units each having a stator and a rotor arranged with their working faces spaced apart along the axis of rotor rotation to provide an axial air gap therebetween, and means mounting said units in end-to-end relation including shaft means mounting said rotors for rotation about a common axis, mounting means common to said stators, and means mounting said stators on said common mounting means including adjustable positioning means mounting each of said stators for movement along said common axis toward and away from the rotor associated therewith for selective adjustment of the air gap of each generator unit independently of the other units.

4. A generator set comprising, a common frame, multiple axial air gap generator units each having a stator and a rotor, and means mounting said generator units in end-to-end relation on said common frame, said mounting means including a shaft journalled on said frame and carrying each of said rotors for rotation about a common axis, and selectively adjustable positioning means mounting said stators on said common frame independently of said rotors and of each other, said positioning means being operable to bring the working surface of each stator into parallelism with that of its associated rotor and to independently move each of said stators along said common axis toward and away from the rotor associated therewith to selectively independently adjust the air gap length of each of said units.

5. A generator set comprising, multiple axial air gap generator units each comprising a stator having a working surface and flux return circuit means behind said working surface and a rotor having a rotor body, permanent magnets carried by said rotor body and extending generally lengthwise of the axis of rotor rotation, and flux return circuit means bearing against the end faces of said magnets remote from the air gap, and means mounting said generator units in end-to-end relation with the rotors of adjacent units alternating with the stators thereof, whereby the stator flux return circuit means of one unit and the rotor flux return circuit means of the adjacent unit cooperate to magnetically shield adjacent units from each other.

6. A generator set comprising, multiple axial air gap generator units each having a stator having flux return circuit means and a rotor, each of said rotors including a rotor body carrying permanent magnets extending generally lengthwise of the axis of rotor rotation, and flux return circuit means secured against the end faces of said magnets remote from the air gap, and means mounting said generator units in end-to-end aligned relation whereby the stator flux return circuit means of one unit and the rotor flux return circuit means of an adjacent unit cooperate to magnetically shield such adjacent units from each other, said mounting means including shaft means mounting said rotors for rotation about a common axis and individually selectively adjustable positioning means mounting said stators for movement toward and away from their associated rotors to selectively adjust the air gap length of each unit.

7. A generator set as defined in claim 5, wherein said rotor body is of a material characterized by a high degree of electrical conductivity and a high degree of mechanical strength, and completely encircles said magnets for substantially the entire length thereof to protect the same against overload and short circuit armature reaction while providing a strong mechanical support therefor.

8. A generator comprising, a rotor carrying permanent magnets extending generally lengthwise of the axis of rotor rotation, a stator having a working surface facing the air gap end of said rotor and spaced apart therefrom along said axis to provide an axial air gap therebetween, shaft means mounting said rotor for rotation about said axis, and adjustable positioning means mounting said stator for selective movement along said axis and toward and away from said rotor to adjust the length of said air gap, said stator mounting means including yoke means connected to said stator for movement therewith, said yoke means having three branches each having an interiorly threaded opening therethrough, said openings being spaced apart to substantially define the points of an equilateral triangle, mounting members extending through said openings in substantial parallelism with said shaft means, exteriorly threaded sleeve means rotatable on said members and threadedly engaging said openings, and pin means carried by said members and bearing against said sleeve means to define stops limiting movement thereof toward said rotor by the magnetic attraction between said stator and said rotor, whereby rotation of said sleeve means causes said stator to move toward and away from said rotor to adjust the length of said air gap.

9. The method of making a pole piece structure for an axial air gap generator which comprises, forming slots lengthwise of a bar of magnetic material to define multiple pole piece sections therein, bonding inserts of non-magnetic material in said slots, removing a portion of said bar centrally thereof to magnetically separate said pole piece sections from each other, and cross-sectioning said bar to remove therefrom a pole piece structure of the desired thickness.

10. An axial air gap generator rotating field structure comprising, a rotor body of non-magnetic material, permanent magnets carried by said body and extending generally lengthwise of the axis of rotor rotation, a pole piece structure comprising magnetic pole piece sections spaced apart by non-magnetic inserts bonded thereto at one end of said rotor body in magnetic contact with said magnets, a flux conducting structure at the opposite end of said rotor body in magnetic contact with said magnets, and tie rod means extending through said rotor body between said pole piece structure and said flux conducting structure to hold them firmly in position.

11. An axial air gap generator unit comprising, a rotating permanent magnet field, an armature, support means mounting said armature for movement toward said field by the force of magnetic attraction therebetween, and position adjusting means selectively operable to advance and retract said armature relative to said field including self-locking means using the force of magnetic attraction to hold said armature in adjusted position.

12. An axial air gap generator as set forth in claim 11, wherein said armature is mounted on a spider, and said support means includes at least three rods in substantial parallelism with the axis of rotor rotation, sleeves threaded in said spider and slidable on said rods, and locking pins carried by said rods acting as stops against which said sleeves abut.

13. A generator set comprising multiple axial air gap generators in end-to-end relation each having a stator and a rotor spaced apart along the axis of rotor rotation, each of said rotors including a rotor body carrying permanent magnets extending generally lengthwise of the axis of rotor rotation, a pole piece structure at one end thereof, and a flux conducting structure at the other end thereof, and means mounting said stators and said rotors in spaced apart relation and maintaining the parts of said rotors in assembled relation including shaft means defining the axis of rotor rotation, means providing a shoulder on said shaft means at one end of the series of rotors, spacer sleeve means around said shaft means extending through said stators between adjacent ones of said rotors, the opposite end portions of said spacer sleeve means bearing against said adjacent rotors, and clamp means carried by said shaft means adjacent the other end of the series of rotors for clamping the same against said spacer sleeve means and said shoulder for rotation with said shaft means, said spacer sleeve means including collar portions receiving and mounting said pole piece structures.

14. An axial air gap generator as set forth in claim 12, wherein each of said locking pins comprises a body portion and opposite end portions of reduced diameter, and each of said sleeves have a serrated end formation interlocking with the end portions of an associated locking pin and extending over the shoulders between said body and end portions thereof, whereby said sleeves releasably retain said locking pins in place.

15. In an axial air gap generator, a field producing structure, and a shaft journaled for rotation about the lengthwise axis thereof, said shaft mounting said field structure, and said field structure comprising, a rotor body of non-magnetic material, permanent magnets carried by said body and extending generally lengthwise of said axis, a pole piece structure at one end of said body in magnetic contact with said magnets, a flux conducting structure at the opposite end of said body in magnetic contact with said magnets, said flux conducting structure being secured to said shaft for rotation therewith, and tie rod means extending through said body between said pole piece structure and said flux conducting structure, said tie rod means firmly positioning said pole piece structure and said flux conducting structure in magnetic contact with the opposite ends of said magnets and thereby locking said pole piece structure and said body to said flux conducting structure and therethrough to said shaft for rotation therewith while enabling said body to float between said pole piece structure and said flux conducting structure.

References Cited in the file of this patent

UNITED STATES PATENTS

| | | |
|---|---|---|
| 1,359,333 | Cowles | Nov. 16, 1920 |
| 1,477,271 | Lowenstein | Dec. 11, 1923 |
| 1,566,693 | Pletscher | Dec. 22, 1925 |
| 1,737,128 | Ross | Nov. 26, 1929 |
| 2,049,616 | Lilja | Aug. 4, 1936 |
| 2,089,758 | Nowosielski | Aug. 10, 1937 |
| 2,221,814 | Reid | Nov. 19, 1940 |
| 2,230,878 | Bohli | Feb. 4, 1941 |
| 2,516,901 | Morrill | Aug. 1, 1950 |
| 2,573,283 | Seitz | Oct. 30, 1951 |
| 2,724,067 | Herrick | Nov. 15, 1955 |

FOREIGN PATENTS

| | | |
|---|---|---|
| 125,692 | Great Britain | June 21, 1918 |